(12) United States Patent
Gassmann

(10) Patent No.: US 8,517,883 B2
(45) Date of Patent: Aug. 27, 2013

(54) TRANSMISSION ASSEMBLY FOR VARIABLE TORQUE DISTRIBUTION

(75) Inventor: Theodor Gassmann, Siegburg (DE)

(73) Assignee: GKN Driveline International GmbH, Lohmar (DE)

( * ) Notice: Subject to any disclaimer, the term of this patent is extended or adjusted under 35 U.S.C. 154(b) by 779 days.

(21) Appl. No.: 12/160,425

(22) PCT Filed: Dec. 22, 2006

(86) PCT No.: PCT/EP2006/012460
§ 371 (c)(1),
(2), (4) Date: Jul. 23, 2010

(87) PCT Pub. No.: WO2007/079956
PCT Pub. Date: Jul. 19, 2007

(65) Prior Publication Data
US 2010/0285916 A1    Nov. 11, 2010

(30) Foreign Application Priority Data
Jan. 9, 2006   (DE) .......................... 10 2006 001 334

(51) Int. Cl.
*F16H 37/02*   (2006.01)
(52) U.S. Cl.
USPC ....................................................... 475/214
(58) Field of Classification Search
USPC .................. 475/220, 221, 225, 230, 329, 330, 475/343
See application file for complete search history.

(56) References Cited

U.S. PATENT DOCUMENTS

| 4,733,579 A | 3/1988 | Lew |
| 6,056,660 A * | 5/2000 | Mimura .......................... 475/205 |

(Continued)

FOREIGN PATENT DOCUMENTS

| DE | 3900638 A1 | 1/1989 |
| DE | 19538661 C1 | 10/1995 |

(Continued)

*Primary Examiner* — David D Le
*Assistant Examiner* — David J Hlavka
(74) *Attorney, Agent, or Firm* — Rader, Fishman & Grauer, PLLC

(57) ABSTRACT

A transmission module for the variable distribution of torque in the driveline of a motor vehicle. A driveshaft 3 in a housing 8, is rotatingly drivable around a first axis of rotation A. A hollow shaft 4 is arranged coaxially relative to the first shaft 3 and is rotatingly drivable relative thereto. A transmission stage 5 having a first sun gear 32 which is drivingly connected to the hollow shaft 4, having a second sun gear 34 which is arranged so as to coaxially adjoin the first sun gear 32 and which is connected to the driveshaft 3 in a rotationally fixed way, and having a hollow gear 33 which, in the housing 8, is rotatably supported on an axis of rotation B extending parallel to the axis of rotation A and which meshingly engages the first sun gear 32 and the second sun gear 34, wherein the first and the second sun gear 32, 34 comprise different numbers of teeth. A friction coupling 6 has a first coupling part 26 which is connected to the first sun gear 32 in a rotationally fixed way and has a second coupling part 27 which is rotatable relative to the first coupling part 26 and which is connected to the hollow shaft 4 in a rotationally fixed way. By actuating the friction coupling 6, the first sun gear 32 is drivingly connected to the hollow shaft 4.

20 Claims, 9 Drawing Sheets

(56) References Cited

U.S. PATENT DOCUMENTS

| | | | | |
|---|---|---|---|---|
| 6,120,407 | A * | 9/2000 | Mimura | 475/225 |
| 6,955,623 | B2 * | 10/2005 | Pattok | 475/3 |
| 7,086,985 | B2 * | 8/2006 | Nakajima | 475/248 |
| 7,338,404 | B2 * | 3/2008 | Gassmann et al. | 475/231 |
| 7,955,209 | B2 * | 6/2011 | Nett et al. | 475/205 |
| 8,057,351 | B2 * | 11/2011 | Joachim et al. | 475/342 |
| 8,303,451 | B2 * | 11/2012 | Yokoo et al. | 475/231 |
| 2005/0061576 | A1 | 3/2005 | Nakamura et al. | |

FOREIGN PATENT DOCUMENTS

| | | |
|---|---|---|
| DE | 198 01 494 A1 | 1/1998 |
| DE | 692 22 739 T2 | 5/1998 |
| DE | 103 14 771 A1 | 3/2003 |
| DE | 10 2005 003 691 A1 | 3/2004 |
| DE | 10 2005 004 291 A1 | 1/2005 |
| EP | 0 546 733 A1 | 6/1993 |
| EP | 0 844 416 A2 | 5/1998 |
| GB | 988945 | 7/1961 |
| JP | 5147450 A | 6/1993 |

* cited by examiner

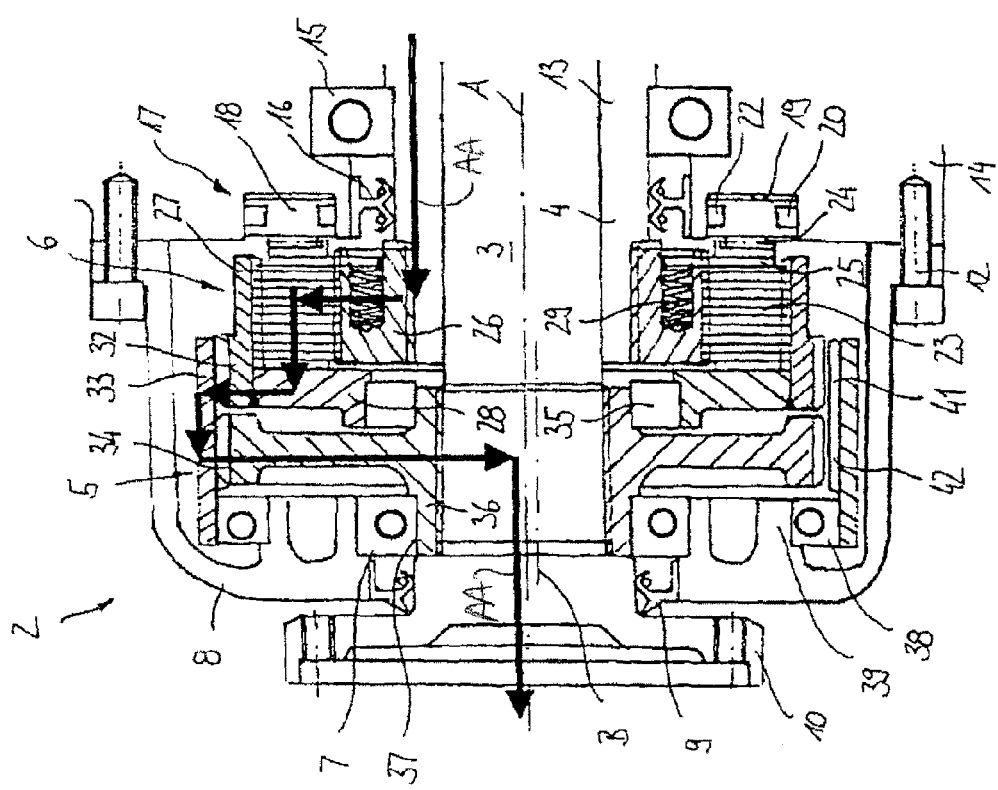

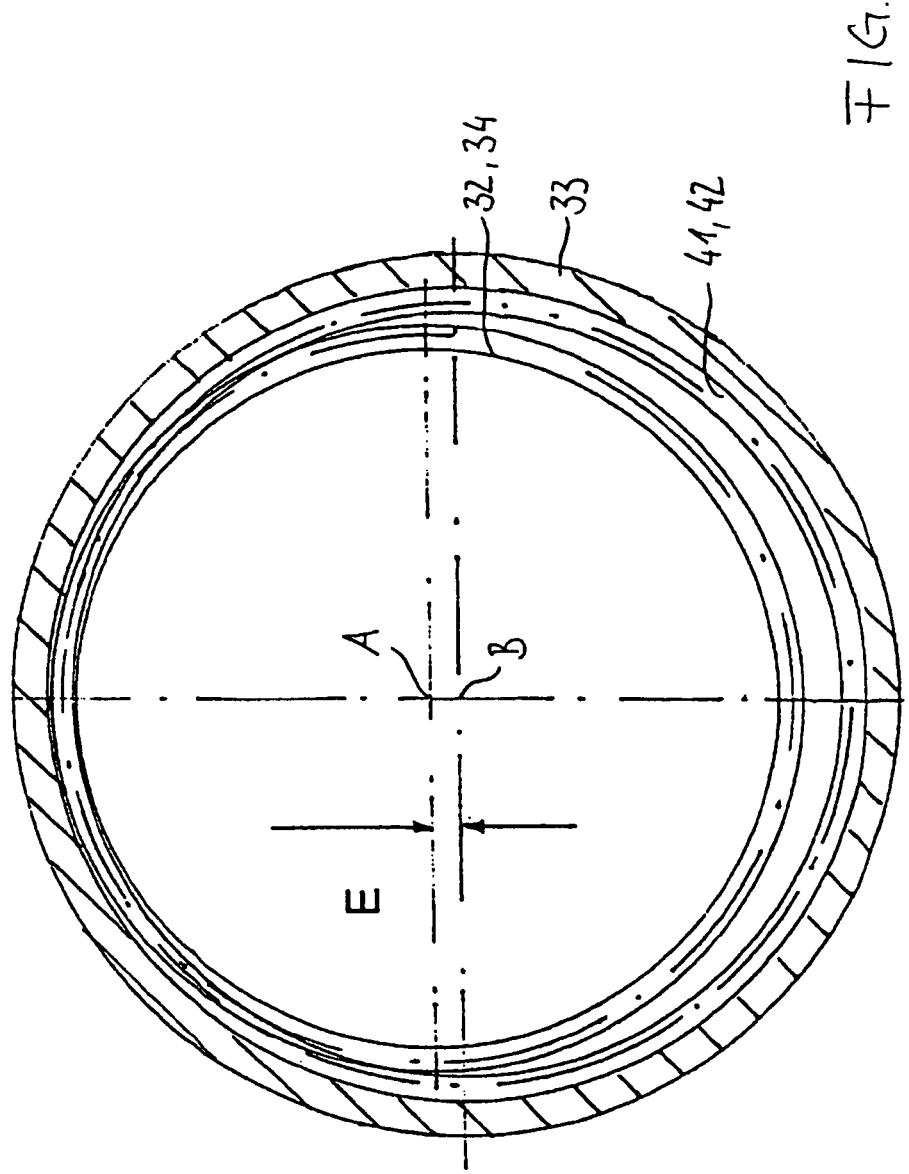

TRANSMISSION ASSEMBLY FOR VARIABLE TORQUE DISTRIBUTION

TECHNICAL FIELD

The present invention relates to a transmission module for a differential assembly for variably distributing torque in the driveline of a motor vehicle.

BACKGROUND

The invention relates to a transmission module for a differential assembly for variably distributing torque in the driveline of a motor vehicle and to a differential assembly having such a transmission module. Differential assemblies of said type commonly comprise a differential drive with one input shaft and two output shafts, wherein the output shafts have a balancing effect relative to one another.

The mode of functioning of the differential assembly for variably distributing torque is such that part of the torque introduced via the input shaft is branched off by the differential carrier prior to being distributed to the two output shafts. The branched-off part of the torque is additionally introduced into one of the two output shafts behind the region where the remaining torque is distributed. For this purpose, a transmission stage and a friction coupling are provided for each output shaft. The transmission stage comprises an input gear which is driven by the differential carrier and which is accelerated or decelerated by an output gear. The latter is accelerated or decelerated by coupling the output gear to the associated output shaft of the differential. If required, a greater amount of torque can be transmitted to the one of the two output shafts than to the other one of the output shafts in order to increase the driving stability of the motor vehicle. Such transmission assemblies can be used for distributing torque between the two sideshafts of an axle differential or for the controlled distribution of the torque between the two output shafts of a central differential of a motor vehicle driven by a plurality of axles.

From DE 10 2005 004 291 A1 there is known a differential assembly with a differential drive and two transmission stages. Each of the transmission stages comprises two sun gears with different numbers of teeth, as well as planetary gears engaging the sun gears. For the purpose of achieving a transmission ratio from the first sun gear to the second sun gear, these comprise teeth whose profiles are displaced relative to one another and which engage continuous teeth of the planetary gears.

It is the objective of the present invention to propose a transmission module for a differential assembly which has a simple design, which permits a high setting accuracy and features low power losses. Furthermore, it is the object of the present invention to propose a transmission assembly for the variable distribution of torque, having such a transmission module.

SUMMARY OF THE INVENTION

A first embodiment of the invention provides a transmission module for the variable distribution of torque in the driveline of a motor vehicle A driveshaft in a housing is rotatingly drivable around a first axis of rotation. A hollow shaft is arranged coaxially relative to the first shaft and is rotatingly drivable relative thereto. A transmission stage is provided with a first sun gear which can be drivingly connected to the hollow shaft, a second sun gear which is arranged so as to coaxially adjoin the first sun gear and which is connected to the driveshaft in a rotationally fixed way, and a hollow gear which, in the housing, is rotatably supported on an axis of rotation extending parallel to the axis of rotation and which meshingly engages the first sun gear and the second sun gear. The first and the second sun gear have different numbers of teeth. A friction coupling is also provided which has a first coupling part which is connected to the first sun gear in a rotationally fixed way and a second coupling part which is rotatable relative to the first coupling part and which is connected to the hollow shaft in a rotationally fixed way. Actuation of the friction coupling drivingly connects the first sun gear to the hollow shaft.

A second embodiment of the invention also provides a transmission module for the variable distribution of torque in the driveline of a motor vehicle. In this embodiment, a driveshaft in a housing, is rotatingly drivable around a first axis of rotation and a hollow shaft is arranged coaxially relative to the first shaft and rotatingly drivable relative thereto. A transmission stage is provided with a first sun gear which can be drivingly connected to the hollow shaft, a second sun gear which is arranged so as to coaxially adjoin the first sun gear and which is connected to the driveshaft in a rotationally fixed way, and a hollow gear which, in the housing, is rotatably supported on an axis of rotation extending parallel to the axis of rotation and which meshingly engages the first sun gear and the second sun gear. The first and the second sun gear have different numbers of teeth. A friction coupling is also provided which has a first coupling part which is connected to the first sun gear in a rotationally fixed way and a second coupling part which is rotatable relative to the first coupling part and which is connected to the driveshaft in a rotationally fixed way. Actuation of the friction coupling drivingly connects the driveshaft to the second sun gear.

A third embodiment of the invention provides a transmission module for the variable distribution of torque in the driveline of a motor vehicle In this embodiment, a driveshaft in housing is rotatingly drivable around a first axis of rotation and a hollow shaft is arranged coaxially relative to the first shaft and is rotatingly drivable relative thereto. A transmission stage is provided with a first sun gear which can be drivingly connected to the hollow shaft, a second sun gear which is arranged so as to coaxially adjoin the first sun gear and which is connected to the driveshaft in a rotationally fixed way, and a hollow gear which, in a carrying element, is rotatably supported on an axis which extends parallel to the axis of rotation and whose teeth engage those of the first sun gear and of the second sun gear. The first and the second sun gear have different numbers of teeth, and the carrying element, in the housing, is rotatably supported coaxially relative to the axis of rotation. A friction coupling is also provided which has a first coupling part which is connected to the housing in a rotationally fixed way, and has a second coupling part which is rotatable relative to the first coupling part and which is connected to the carrying element in a rotationally fixed way. Actuation of the friction coupling decelerates the carrier element relative to the housing.

All three inventive embodiments are advantageous in that they feature a simple design and are thus easy to produce and assemble. The transmission stage only requires one hollow gear whose teeth engage those of the first and second sun gears. In total, each transmission stage comprises only three gearwheels. Using the hollow gear is particularly advantageous because there is achieved a high degree of envelopment around the sun gears. This means that a large number of teeth of the pairs of teeth formed between the hollow gear and sun gear engage one another, so that the load per tooth is low. A further advantage of the inventive transmission module is that the radial installation space is relatively small and the unit is compact. The transmission module is suitable for many different applications and can be used for example in an axle differential for variably distributing torque between two sideshafts of a driving axle. Alternatively, or in addition, the transmission module can also be used in a central differential of a motor vehicle driven by a plurality of axles; it will serve for variably distributing torque between the front axle and the rear axle.

The term "drivingly connectable" means that the two associated components, depending on requirements, can be coupled to one another by actuating the friction coupling or they can be uncoupled from one another. The friction couplings are preferably provided in the form of multi-plate couplings and comprise two coupling parts, i.e. an outer plate carrier to which outer plates are connected in a rotationally fixed and axially displaceable way and an inner plate carrier to which inner plates are connected in a rotationally fixed and axially displaceable way. It is understood that the two coupling parts in the three embodiments, in principle, can be provided in the form of outer plate carriers and also in the form of inner plate carriers.

According to a first variant which applies to all three embodiments, the hollow gear comprises a first toothed portion which engages the first sun gear, and a second toothed portion which engages the second sun gear, wherein the two toothed portions comprise different toothings with different numbers of teeth.

According to an alternative variant which applies to all three embodiments, the hollow gear comprises a first toothed portion which engages the first sun gear, and a second toothed portion which engages the second sun gear, wherein the two toothed portions comprise identical teeth. For achieving a speed increasing ratio and a speed reducing ratio, the two sun gears which comprise the same axial distance from the axis of rotation of the hollow gear, relative to one another, comprise profile-displaced teeth. The advantage of identical toothed portions of the hollow gear consists in that there exists a high degree of accuracy in the way in which the teeth of the hollow gear engage those of the sun gear. It is particularly advantageous if the two toothed portions of the hollow gear adjoin one another seamlessly, i.e. form one single common continuous toothing. In this way it is possible to produce both toothed portions at the same time, which has an advantageous effect on costs. The teeth of the two sun gears and the teeth of the hollow gear comprise the same modulus. The transmission ratio and reduction ratio from the first sun gear to the second sun gear are achieved entirely by the profile displacement of the two sets of teeth.

According to a preferred embodiment which applies to both variants, the numbers of teeth of the first and of the second sun gear have been selected to be such that there is generated a transmission ratio of 0.85 to 1.15—with the exception of a transmission ratio of 1.0—between the first and the second sun gears. In this way it is possible to achieve an additional or reduced torque of ±15% to the respective driveshaft. Preferably, a speed increasing ratio is generated from the first sun gear to the second sun gear. For this purpose, the number of teeth of the hollow gear is greater than the number of teeth of the first sun gear, which number, in turn, is greater than the number of teeth of the second sun gear. As a result of this design, an additional torque can be applied directly to the second sun gear connected to the driveshaft. However, a speed reducing ratio is also possible, wherein, when the friction coupling is actuated, an additional torque would be introduced into the hollow gear.

In order to achieve an advantageous NVH (Noise, Vibration, Harshness) behaviour, the sun gears and the hollow gear preferably comprise helical teeth which are preferably designed in such a way that the axial forces acting on the first and the second sun gears as a result of the engaging teeth are directed towards each other when the vehicle is moving forwards. As an alternative to the helical teeth, the sun gears and the hollow gear can also comprise straight teeth. The hollow gear is preferably rotatably supported on a bearing projection of the housing by means of a rolling contact bearing so as to extend eccentrically relative to the axis of rotation of the sun gears. Furthermore, according to a preferred embodiment, the first sun gear, by bearing means, is rotatably supported on the second sun gear which, in turn, is drivingly connected to the driveshaft.

According to a preferred further embodiment, there is provided an axial setting device for actuating the friction coupling which can be provided, for example, in the form of a known ball ramp assembly which comprises two discs centred on the axis of rotation and balls held axially between the discs. One of the discs is axially supported relative to the housing and the other one is axially displaceable. On their end faces facing one another, the two discs comprise identical numbers of ball grooves whose depth increases in opposed circumferential directions, with a ball being held in each pair of opposed ball grooves. By rotating the two discs relative to one another, there takes place a spreading effect, with the friction coupling thus being actuated. As an alternative to the ball ramp assembly, the friction coupling can also be actuated hydraulically. For this purpose, the axial setting device is provided in the form of a piston/cylinder unit. The piston is annular in shape and is positioned in an outwardly sealed annular chamber in the housing. The annular piston loads the plate package of the friction coupling via an axial bearing.

A further embodiment to the above-mentioned objective consists in providing a differential assembly for variably distributing torque in the driveline of a motor vehicle, comprising a differential drive with a rotatingly drivable differential carrier, differential gears which are rotatingly held in the differential carrier and rotate jointly therewith around the axis of rotation, as well as two sideshaft gears which are rotatably supported on the axis of rotation and which engage the differential gears Also, at least one transmission module according to any one of the above-mentioned three embodiments is provided, wherein the hollow shaft is connected to the differential carrier in a rotationally fixed way and wherein the driveshaft is connected to one of the two sideshaft gears in a rotationally fixed way. The transmission module can comprise one of the above-mentioned embodiments. The differential assembly can be used as an axle differential of a motor vehicle driven by one or several axles and/or as a central differential of a motor vehicle driven by several axles.

BRIEF DESCRIPTION OF THE DRAWINGS

Embodiments of the invention will be described below with reference to the drawing figures wherein:

FIG. 1 shows in a longitudinal section an inventive transmission module according to a first embodiment, the arrangement of the teeth being in a cross-sectional view.

DESCRIPTION OF THE PREFERRED EMBODIMENTS

Figure 2:
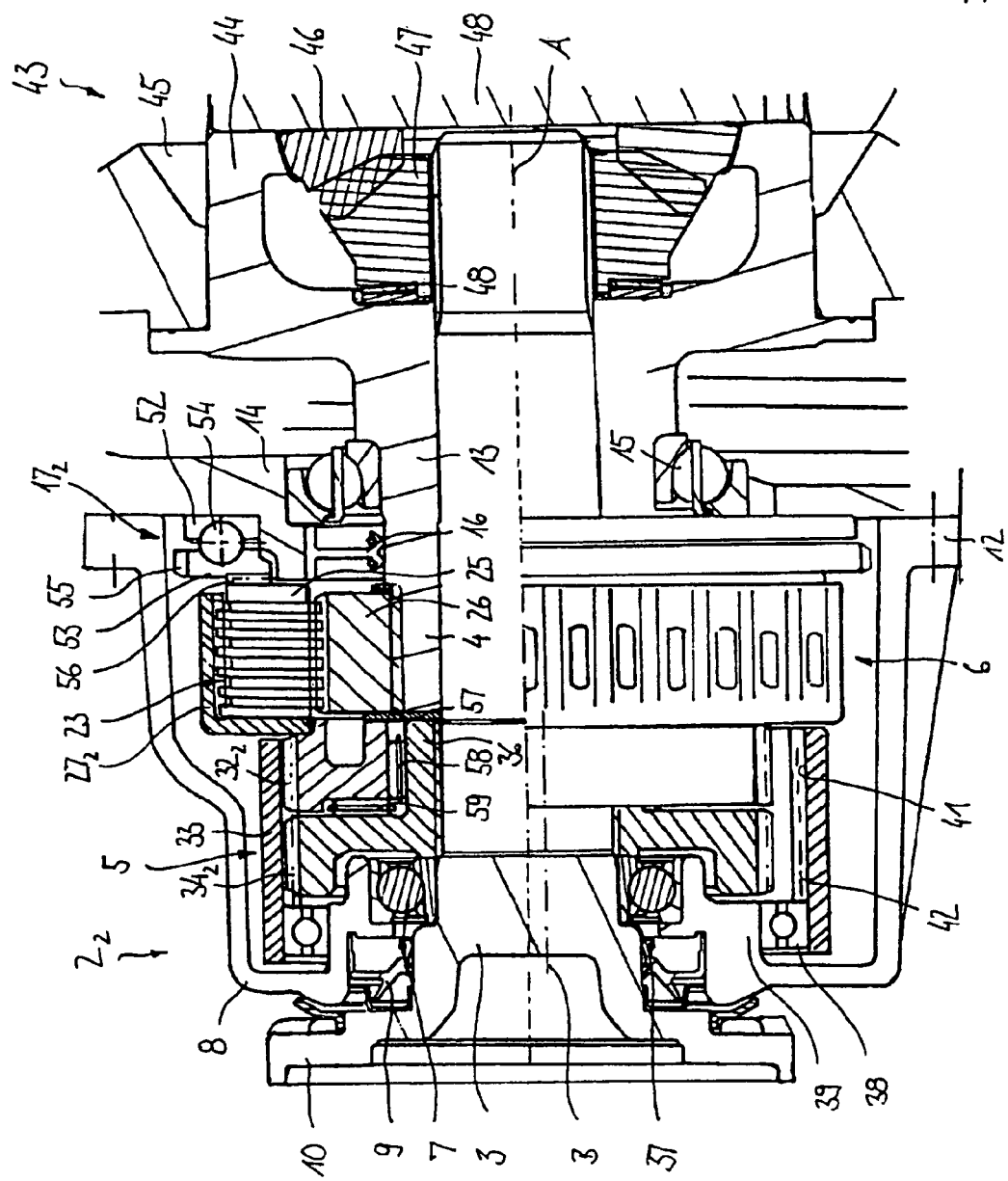
FIG. 2 shows an inventive transmission module according to a second embodiment in a longitudinal section.

FIG. 1 shows a transmission module 2 which comprises a first shaft in the form of a driveshaft 3, a second shaft in the form of a hollow shaft 4 rotatably supported coaxially relative to the first shaft 3, a transmission stage 5 positioned in the torque flow between the driveshaft 3 and the hollow shaft 4, as well as a friction coupling 6 for coupling a gearwheel 32 of the transmission stage 5 to the hollow shaft 4. The driveshaft 3 is rotatably supported by a rolling contact bearing 7 in a housing 8 of the transmission module 2 and sealed relative thereto by a shaft sealing ring 9. At the output end, the driveshaft 3 comprises a flange 10 for being connected to an associated sideshaft of the motor vehicle (not illustrated).

The transmission module 2 is bolted via a flange connection 12 to a differential housing of a differential drive (not shown). The driveshaft 3 is connected in a rotationally fixed way via longitudinal teeth to a sideshaft gear of the differential drive. The hollow shaft 4 is connected in a rotationally fixed way via longitudinal teeth to the differential carrier. In the present embodiment, the hollow shaft 4 is produced so as to be integral with a sleeve projection 13 of the differential carrier. The sleeve projection 13 is rotatably supported relative to the differential housing 14 by means of a rolling contact bearing 15 and sealed relative thereto by a sealing ring 16.

For actuating the friction coupling 6, there is provided an axial setting device 17 which is provided in the form of a hydraulically actuated piston cylinder unit which comprises an annular piston 18 which is positioned in an annular chamber 19 of the differential housing 14 and which is sealed by sealing rings 20, 22 relative thereto. When the annular chamber 19 is pressure-loaded by a hydraulic medium, the piston 18 is displaced towards the friction coupling 6. Thereby, the friction coupling 6 is axially loaded via an axial bearing 24 and a pressure plate 25, which are axially positioned between the piston 18 and the friction coupling 6.

The friction coupling 6 comprises a first coupling part in the form of an inner plate carrier 26 which is connected in a rotationally fixed way to the hollow shaft 4 via longitudinal teeth, wherein inner plates are held so as to be axially movable and rotationally fixed relative to the inner plate carrier 26; as well as a second coupling part in the form of an outer plate carrier 27 which is connected to the gearwheel 32 of the transmission stage 5 in a rotationally fixed way, wherein the outer plates are held so as to be axially movable and rotationally fast relative to the outer plate carrier 27. Said outer plates and inner plates are arranged so as to alternate axially and jointly form a plate package 23. In the inner plate carrier 26 there are arranged a spring member 29 which is axially supported against the inner plate carrier and which loads the pressure plate 25 against the operating direction of the piston cylinder unit. The spring member 29 provided in the form of coil or helical springs thus serve to effect the return movement, so that the friction coupling is ventilated when the piston cylinder unit is not actuated. The outer plate carrier 27 is cup-shaped and comprises a base 28 which serves as a supporting face for the plate package 23. Furthermore, the outer plate carrier 27 is produced so as to form one piece with the gearwheel of the transmission stage, which gearwheel is provided in the form of a sun gear 32.

In addition to the first sun gear 32, the transmission stage 5 comprises a hollow gear 33 engaging the first sun gear 32. A second sun gear 34 engages the hollow gear 33 and which is arranged so as to axially adjoin the first sun gear 32. The first sun gear 32 is connected to the outer plate carrier 27 and, via the latter, it is rotatably supported on a hub 36 of the second sun gear 34 by means of a roiling contact bearing 35. The rolling contact bearing 35 serves as a radial and axial bearing. The friction coupling 6 is positioned radially inside the hollow gear 33 and partially overlaps same, so that there is achieved a compact design. The second sun gear 34 is connected in a rotationally fixed way with the driveshaft 3 via a splined connection between the hub 36 and the driveshaft 3. At the flange end, the hub 36 comprises an outer bearing face 37 which holds the rolling contact bearing 7. The hollow gear 33 is rotatably supported by a rolling contact bearing 38 on a bearing projection 39 of the module housing 8 on an axis B which extends eccentrically relative to the axis of rotation A. As a result, the sun gears 32, 34 engage the hollow gear 33 in a circumferential region, which can be seen in the upper half of FIG. 1. The arrangement of the sun gears 32, 34 relative to the hollow gear 33 is particularly obvious in FIG. 2. This shows the axial distance between the axis of rotation A on which there are arranged the sun gears 32, 34, as well as the axis B on which there is positioned the hollow gear 33, which axial distance has been given the reference symbol E. The speed ratio is achieved by the profile displacement of the toothings of the two sun gears 32, 34, with the sun gears and the hollow gear 33 having the same modulus.

The hollow gear 33 comprises two toothed portions 41, 42 with corresponding toothings one of which engages the first sun gear 32 and the other one the second sun gear 34. In order to achieve the speed ratio between the two sun gears 32, 34, these have different numbers of teeth, with the numbers of teeth of the sun gears 32, 34 having been selected to be such that between the hollow shaft 4 and the driveshaft 3 there is achieved a speed differential of up to 15%. In the present case, a speed increasing ratio is generated from the first sun gear 32 to the second sun gear 34. For this purpose, the number of teeth Z1 of the first sun gear 32 is greater than the number of teeth Z2 of the second sun gear 34, with the ratio Z1:Z2 ranging between 1.10 and 1.12. The number of teeth Z3 of the hollow gear 33 is greater than the number of teeth Z1 of the first sun gear 32.

The transmission module functions as follows: When the friction coupling 6 is open, the inner plate carrier 26 which is connected in a rotationally fixed way via the hollow shaft 4 to the differential carrier 13, rotates faster than the outer plate carrier 27 which is drivingly connected via the transmission stage 5 to the driveshaft 3. When the friction coupling 6 is closed as a result of the axial setting device having been actuated, an additional torque is taken directly from the differential carrier and introduced via the friction coupling 6 and the transmission stage 5 into the driveshaft 3. This additional torque flow is illustrated by arrows AA in FIG. 1. Closing the coupling thus leads to an asymmetric distribution of torque between the two output shafts of the differential drive, so that the driving stability of the motor vehicle is increased under certain driving conditions.

FIG. 2 shows a second embodiment of an inventive transmission module which, in respect of its design, largely corresponds to that illustrated in FIG. 1 and to the description to which reference is hereby made as regards common features. The reference numbers of any components corresponding to one another have been provided with the subscript "2". FIG. 2 also shows the differential drive 43 with its differential carrier 44 to which there is attached a ring gear 45 for torque introducing purposes. The differential carrier 44 comprises two sleeve-shaped projections 13 via which it is supported in the differential housing 14 by means of the rolling contact bearings 15 so as to be rotatable around the axis of rotation A. In the differential carrier 44, there is rotatably supported a plurality of differential gears 46 on journals 49 extending perpendicularly relative to the axis of rotation A, said gears 46 jointly rotating with the differential carrier 44 around the axis of rotation A. The differential gears 46 meshingly engage two sideshaft gears 47 which serve to trans-mit torque to the respective driveshaft 3 of the transmission module 2. The sideshaft gears 47 are rotatably supported in the differential carrier 44 on the axis of rotation A and are axially supported relative thereto by abutment discs 48. The present Figure shows only half the differential drive and only one transmission module, with the invisible half being approximately mirror-symmetric relative to the visible half.

The illustrated transmission module $2_2$ is characterised in that the axial setting device $17_2$ is provided in the form of a ball ramp assembly which comprises two discs 52, 53 extending coaxially relative to the axis of rotation A, as well as balls 54 held between the discs. The first one of the discs is provided in the form of a supporting disc 52 which is axially supported relative to the differential housing 14 and is held in a rotationally fixed way relative thereto. The second disc is provided in the form of an axially displaceable and rotatingly drivable setting disc 53. On their end faces facing one another, the two discs 52, 53 comprise a plurality of circumferentially distributed and circumferentially extending ball grooves whose depths vary in opposite directions. In each pair of opposed ball grooves, there is received one of the balls 54 via which the two discs are axially supported. The setting disc 53 is only radially supported via the balls 54 relative to the supporting disc 52, with the supporting disc being fixed on a sleeve-shaped projection of the differential housing 14. The balls 54 are held in a cage with circumferentially distributed windows, which cage is axially arranged between the two discs.

To achieve a rotational movement of the setting disc 53, its outer circumferential face is provided with outer teeth 55. Said outer teeth 55 are engaged by a pinion (not shown), which is rotatably supported in the housing 14 and which is rotatingly drivable by an electric motor. In the non-actuated condition, i.e. when the friction coupling 6 is fully open, the setting disc 52 and the supporting disc 53 are in the closest possible position relative to one another. When the setting disc 52 is suitably rotated, the balls 54 run in low-depth regions. The discs are thus spread apart, with the setting disc 52 being axially displaced towards the friction coupling 6. On its reverse side, the setting disc 52 comprise a radial pressure face which, via an intermediate axial bearing 56, axially loads the pressure plate 25. The pressure plate 25 is in axial contact with the plate package 23 and loads same when the ball ramp assembly is subjected to an axial force in the closing sense. Thus, actuating the ball ramp assembly leads to a predetermined locking of the friction coupling 6 and thus to the first sun gear $32_2$ being coupled to the more rapidly rotating differential carrier 44. For again opening the friction coupling 6, the setting disc 53 is actuated in the opposite direction, with pressure springs (not visible in the present sectional view) which are axially supported on the transmission housing and load the setting disc 53 effecting a return of the setting disc 53 towards the supporting disc 54.

Furthermore, it can be seen that between the hollow shaft 4 and the hub 36 of the second sun gear $34_2$ there is axially arranged an abutment disc 57. The first sun gear $32_2$ is rotatably supported on the hub 36 of the second sun gear $34_2$ by means of a radial bearing 58 and axially supported relative thereto by means of an axial bearing 59. Thus, when actuating the friction coupling 6, axial forces applied by the outer plate carrier $27_2$ to the first sun gear $32_2$ are supported and introduced by the second sun gear $34_2$ via the rolling contact bearing 7 into the module housing 8. As in the above embodiments, the cup-shaped outer plate carrier 27 is firmly connected to the first sun gear $32_2$ by welding. In the present embodiment, the outer plate carrier is arranged so as to adjoin the first sun gear $32_2$. The friction coupling 6 and the plate package 23 are thus positioned on a greater diameter than in the above embodiment, whereas the transmission stage 5 in the present embodiment is radially more compact.

Figure 3:
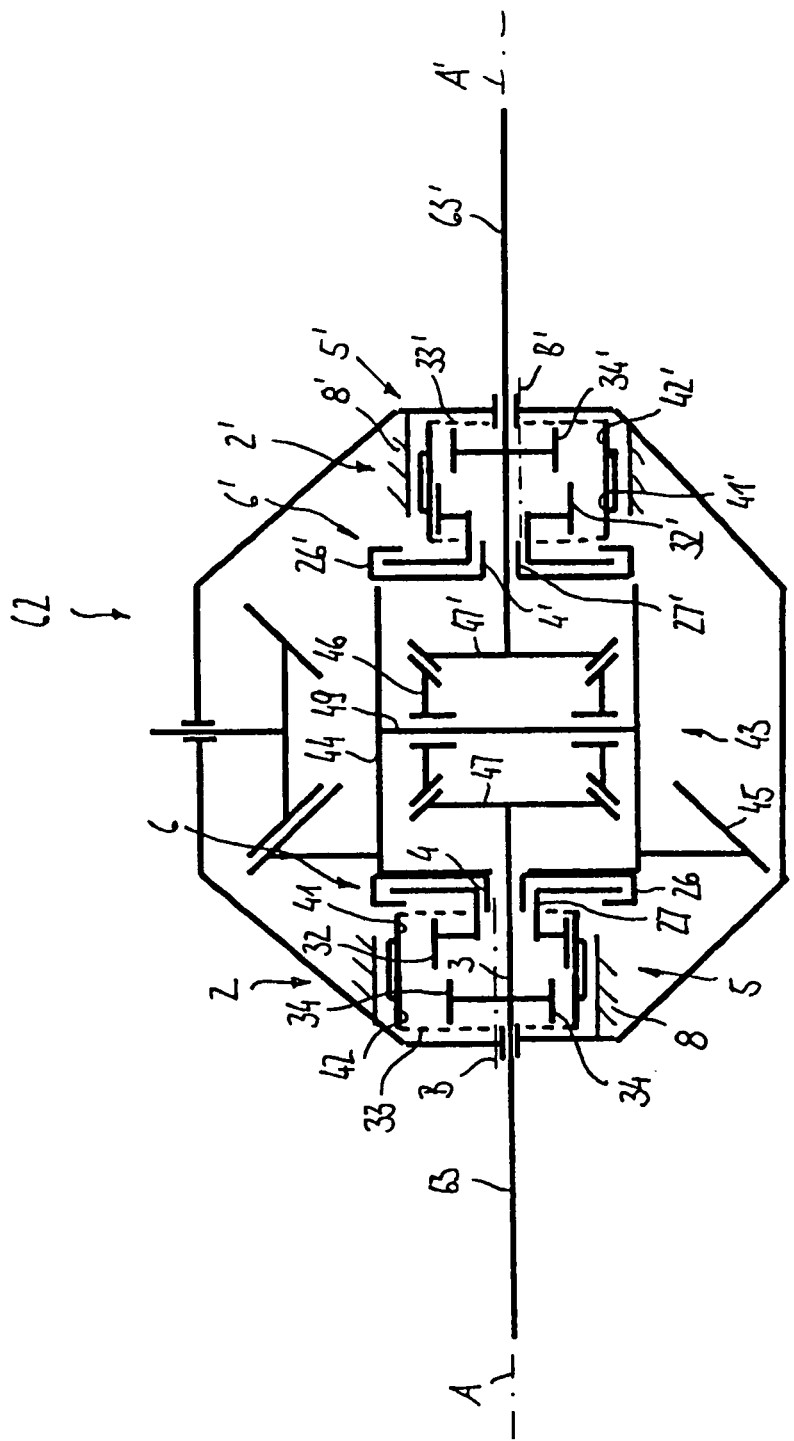
FIG. 3 shows an inventive transmission assembly with an inventive transmission module in a third embodiment showing the design principle.

FIG. 3 shows the design principles of an inventive differential assembly 62 for variably distributing torque between two sideshafts 63, 63' in the driveline of a motor vehicle. The differential assembly 62 is symmetric in design and, as described in connection with FIG. 2, comprises a differential drive 43 with two inventive drive modules 2, 2' which are arranged so as to axially adjoin the differential drive 43. The two transmission modules 2, 2' correspond to one another and will therefore be described jointly, with the reference numbers of components of the righthand transmission module being provided with an apostrophe. Furthermore, the transmission modules correspond to one another in respect of their design and mode of functioning as shown in FIGS. 1 and 2. Reference is therefore made to the description of same. Those components which correspond to one another have been given the same reference numbers as in FIGS. 1 and 2. In the present illustration giving the design principles, the axial setting devices required for actuating the friction couplings 6, 6' are not shown. There can be seen a ring gear 45 which meshingly engages a driving pinion.

The present embodiment differs from that described above in that, in the present case, the outer plate carrier 26, 26' of the friction coupling 6, 6' is connected to the differential carrier 44 in a rotationally fixed way, whereas the inner plate carrier 27, 27' is connected in a rotationally fixed way to the first sun gear 32, 32'. However, this does not change the mode of functioning of the differential assembly. In accordance with the embodiments according to FIGS. 1 and 2, the first sun gear 32, 32' which can be coupled to the differential carrier 44 comprises a higher number of teeth Z1 than the second sun gear 34, 34' which is connected in a rotationally fixed way to the driveshaft 3, 3', so that a speed increasing ratio is effected. The hollow gear 33, 33' comprises two toothed portions with continuous teeth, with a first toothed portion 41, 41' engaging the first sun gear 32, 32' and with a second toothed portion 42, 42' engaging the second sun gear 34, 34'. The speed ratio is achieved by a profile displacement of the toothings of the two sun gears 32, 32', 34, 34'. It can be seen that the lefthand and the righthand hollow gear are arranged on different eccentric axes B, B' while having the same axial distance from the axis of rotation A. In the case of the lefthand transmission module 2, the interengaging teeth of the hollow gear 33 and of the sun gears 32, 34 are shown in the lower half of the Figure, whereas in the case of the righthand transmission module 2' the interengaging teeth of the hollow gear 33' and of the sun gears 32', 34' are shown in the upper half of the Figure.

Figure 4:
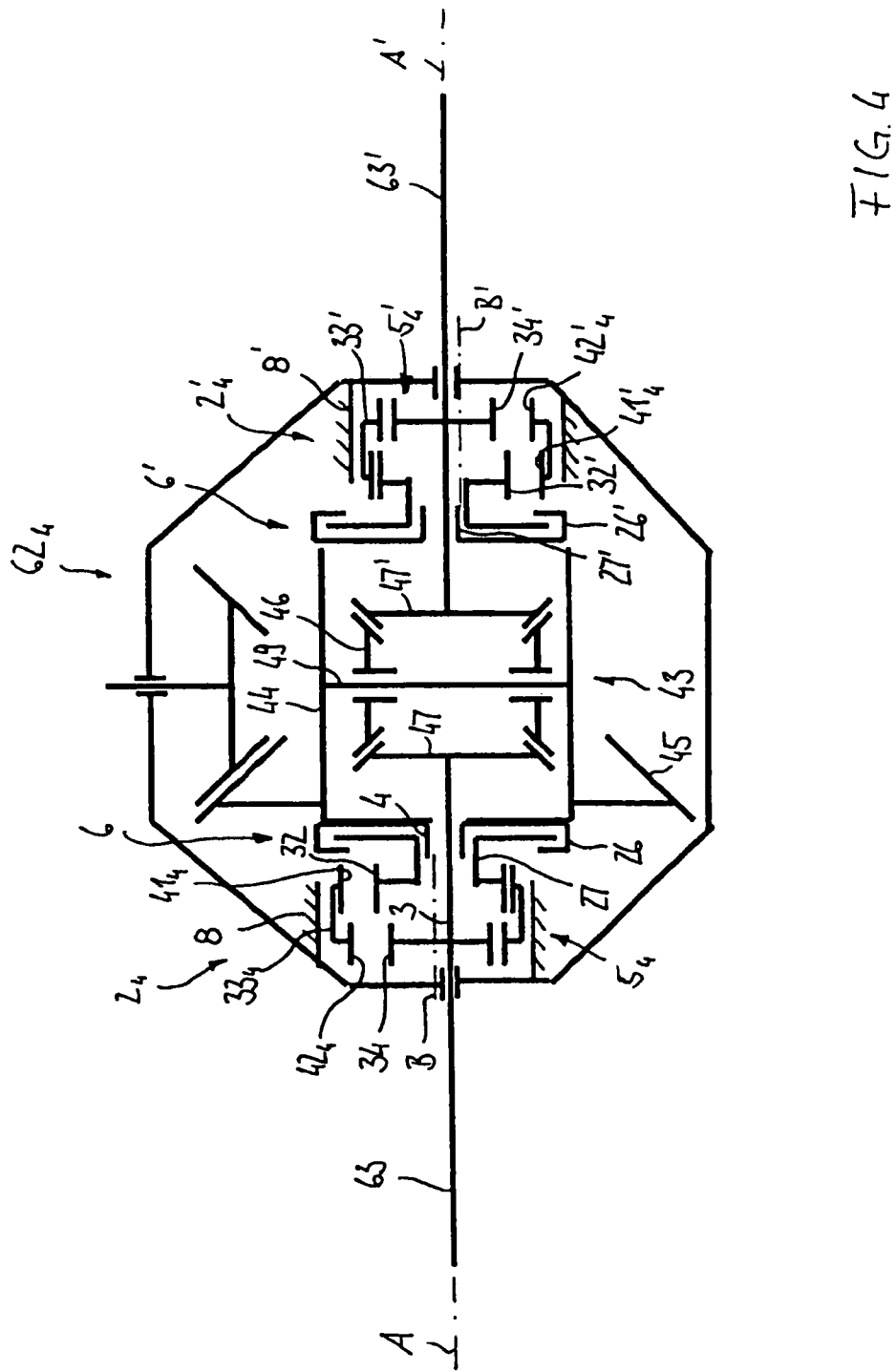
FIG. 4 is a diagrammatic illustration of an inventive transmission assembly with an inventive transmission module in a fourth embodiment showing the design principle.

FIG. 4 shows a transmission assembly in a further embodiment which, in respect of design, largely corresponds to that shown in FIG. 3. To that extent, reference is made to the above description. Those components which correspond to one another have been given the same reference numbers whereas the reference numbers of any modified components have been provided with the subscript "4". The present embodiment differs only in respect of the design of the hollow gears $33_4$, $33_4'$. The toothed portion $41_4$, $41_4'$ which engages the first sun gear 32, 32' and the toothed portion $42_4$, $42_4'$ which engages the second sun gear 34, 34' are located on different diameters and comprise different numbers of teeth. In accordance with the above embodiments, the number of teeth Z1 of the first sun gear 32, 32' which can be coupled to the differential carrier 44 is greater than the number of teeth Z2 of the second sun gear 23, 23' which is connected in a rotationally fixed way to the driveshaft 3, 3', so that a speed increasing ratio takes place. Accordingly, the first toothed portion $41_4$, $41_4'$ which engages the first sun gear 32, 32' comprises a larger number of teeth than the second toothed portion $42_4$, $42_4'$ which engages the second sun gear 34, 34' of the hollow gear. The mode of functioning is the same as in the case of the above embodiments.

Figure 5:
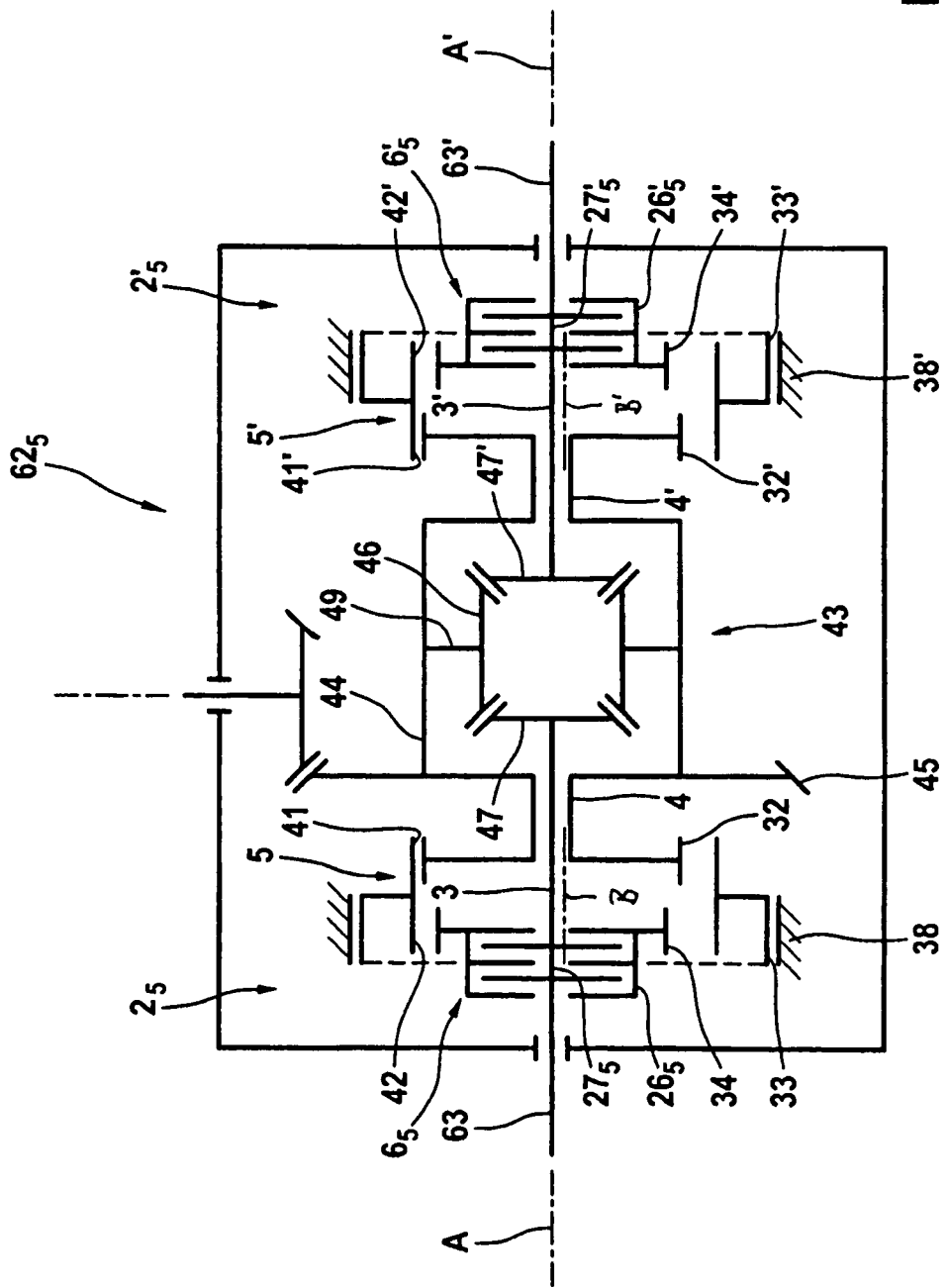
FIG. 5 is a diagrammatic illustration of an inventive transmission assembly with an inventive transmission module in a fifth embodiment showing the design principle.

FIG. 5 shows a transmission assembly in a further embodiment which, in respect of design and mode of functioning, largely corresponds to that shown in FIG. 3. To that extent reference is made to the above description. Those components which correspond to one another have been given the same reference numbers whereas the reference numbers of any modified components have been provided with the subscript "5". As the two transmission modules $2_5$, $2_5'$ correspond to one another, they will be described jointly below. The present embodiment is characterised in that the first sun gear 32, 32' is connected to the differential carrier 44 in a rotationally fixed way and that the second sun gear 34, 34' can be coupled via the friction coupling 6, 6' to the driveshaft 3, 3'. The first coupling part $26_5$, $26_5'$ of the friction coupling 6, 6', which is provided in the form of the outer plate carrier, is connected to the second sun gear 34, 34' in a rotationally fixed way and the second coupling part $27_5$, $27_5'$ of the friction coupling, which is provided in the form of an inner plate carrier, is connected to the output shaft 3, 3'. It can be seen that the hollow gears 33, 33' each comprise a continuous toothing, respectively two toothed portions 41, 42; 41', 42' with corresponding toothing. The toothings of the two sun gears 32, 34; 32', 34' are profile-displaced and comprise different numbers of teeth, and they comprise the same axial distance from the respective hollow gear 33, 33'. The transmission ratio is achieved by the profile displacement of the two sun gears relative to one another. The numbers of teeth of the sun gears 32, 34; 32', 34' have been selected to be such that there is effected a speed increasing ratio, i.e. the outer plate carrier $26_5$, $26_5'$ rotates faster than the driveshaft 3, 3'. Thus, by closing the friction coupling 6, 6', a higher torque can be transmitted to the respective driveshaft 3, 3' than to the driveshaft 3', 3 extending in the opposite direction.

Figure 6:
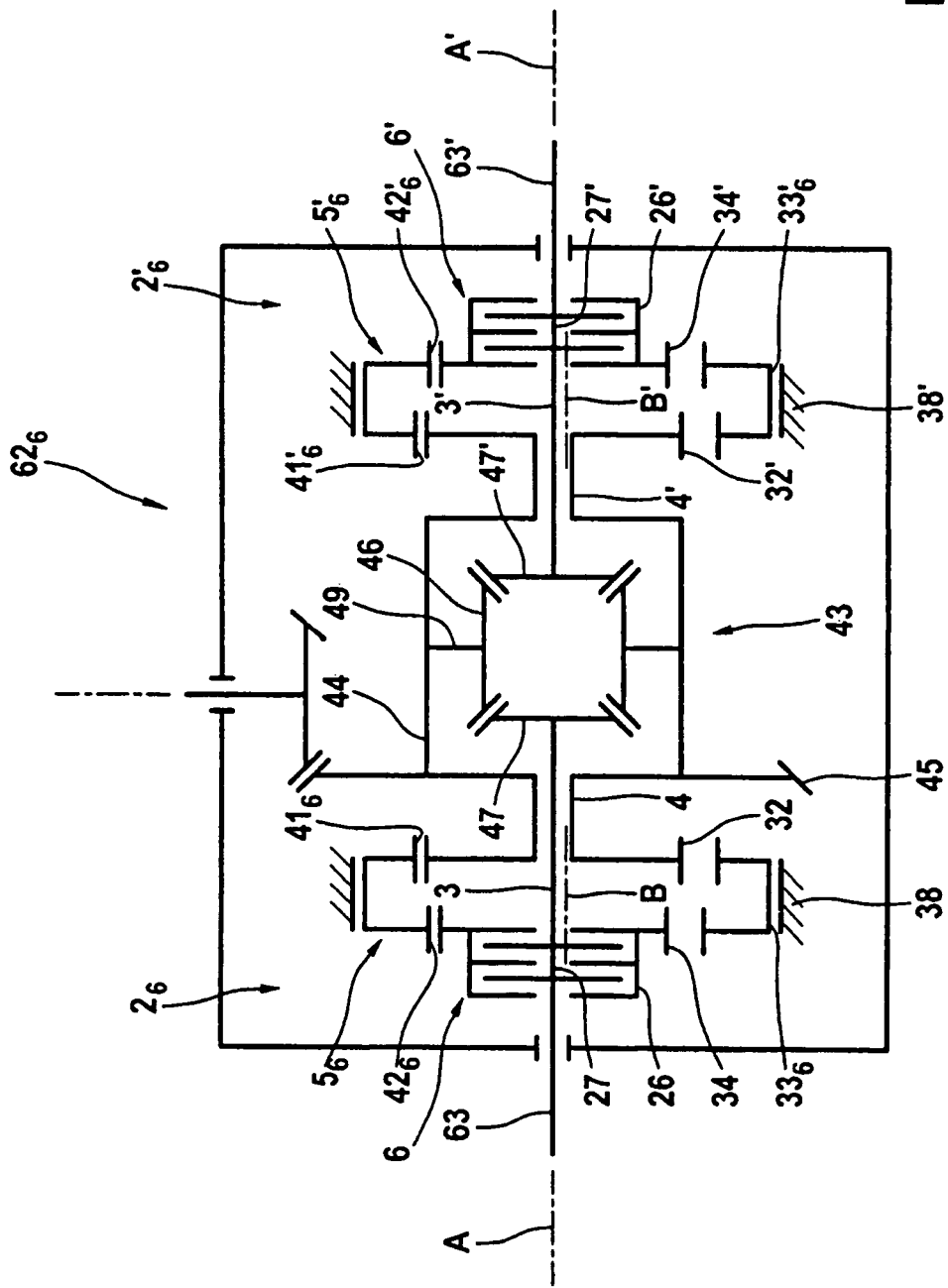
FIG. 6 is a diagrammatic illustration of an inventive transmission assembly with an inventive transmission module in a sixth embodiment showing the design principle.

FIG. 6 shows a transmission assembly in a further embodiment which, in respect of design, largely corresponds to that shown in FIG. 5. To that extent, reference is made to the above description. Those components which correspond to one another have been given the same reference numbers and the reference numbers of any modified components have been provided with the subscript "6". The present embodiment differs only in respect of the design of the hollow gears $33_6$, $33_6'$. The toothed portion $41_6$, $41_6'$ which engages the first sun gear 32, 32' and the toothed portion $42_6$, $42_6'$ which engages the second sun gear 34, 34' are positioned on different diameters and comprise different numbers of teeth. The number of teeth of the first toothed portion $41_6$, $41_6'$ of the hollow gear $33_6$, $33_6'$, which engages the first sun gear 32, 32', is larger than that of the second toothed portion $42_6$, $42_6'$ of the hollow gear $33_6$, $33_6'$, which engages the second sun gear 34, 34'. The mode of functioning is the same as that of the embodiment according to FIG. 5.

Figure 7:
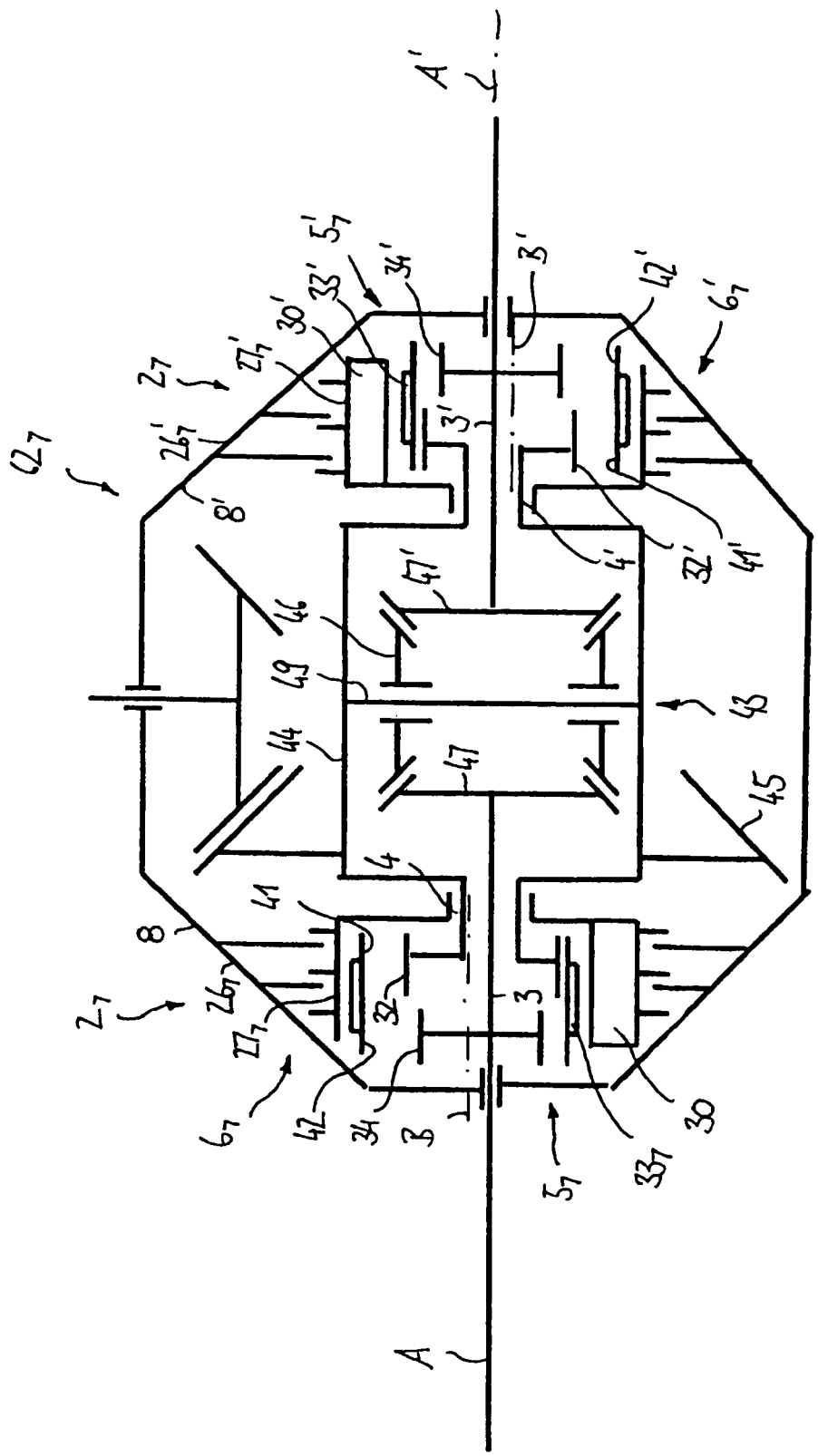
FIG. 7 is a diagrammatic illustration of an inventive transmission assembly with an inventive transmission module in a seventh embodiment showing the design principle.

FIG. 7 shows a transmission assembly in a further embodiment which, in respect of design, largely corresponds to that shown in FIG. 4. To that extent reference is made to the above description. Those components which correspond to one another have been given the same reference numbers whereas the reference numbers of any modified components have been provided with the subscript "7". As the two transmission modules correspond to one another, they will be described jointly below. In the present embodiment the first sun gear 32, 32' is connected to the differential carrier 44 in a rotationally fixed way and the second sun gear 34, 34' is connected to the associated driveshaft 3, 3' in a rotationally fixed way. The hollow gear $33_7$, $33_7'$ which, by means of its first toothed portion 41, 41', is connected to the first sun gear 32, 32' and by means of its second toothed portion 42, 42', engages the second sun gear 34, is rotatably supported in a carrier element 30, 30' on an axis B, B' which extends parallel to the axis of rotation A of the sun gears. The carrier element 30, 30', in turn, is rotatably supported in the housing 8, 8' by means of bearings (not illustrated) so as to extend coaxially relative to the axis of rotation A. The friction coupling $6_7$, $6_7'$ comprises a first coupling part $26_7$, $26_7'$ which is firmly held relative to the stationary module housing 8, 8'. Furthermore, the friction coupling $6_7$, $6_7'$ comprises a second coupling part $27_7$, $27_7'$ which is provided in the form of an inner plate carrier and which is connected in a rotationally fixed way to the carrier element 30, 30'. Needless to say, the inner plate carrier and the outer plate carrier can be interchanged without the mode of functioning of the transmission module changing. The mode of functioning of the assembly is a follows: in the nonactuated condition, the carrier element 30, 30' rotates jointly with the hollow gear 33, 33' blockwise round the axis of rotation A, with "blockwise" meaning that the two components do not carry out a relative movement relative to one another. By actuating the friction coupling $6_7$, $6_7'$, the carrier element 30, 30' is coupled to the housing 8, 8', so that the hollow gear 33, 33' rotates in the carrier element 30, 30' relative thereto around the axis B offset in parallel. Depending on the closed position of the fiction coupling $6_7$, $6_7'$, an additional torque is taken off the differential carrier 44 and transmitted via the hollow shaft 4, 4' and the transmission stage 5, 5' to the driveshaft 3, 3'. It can be seen that the hollow gears $33_7$, $33_7'$ each comprise a continuous toothing or toothed portions 41, 42; 41' 42' with corresponding teeth, respectively. The two sun gears 32, 34; 32', 34' have toothings with different numbers of teeth, which teeth are profile-displaced relative to one another, and they comprise the same axial distance E, E' from the associated hollow gear $33_7$, $33_7'$. Again, the transmission ratio is achieved by the profile displacement of the two sun gears 32, 34; 32', 34' relative to one another. The numbers of teeth of the sun gears have been selected to be such that there is achieved a speed increasing ratio. Thus, by closing the friction coupling $6_7$, $6_7'$, it is possible to transmit a higher torque to the associated driveshaft 3, 3' than to the driveshaft 3', 3 extending in the opposite direction.

Figure 8:
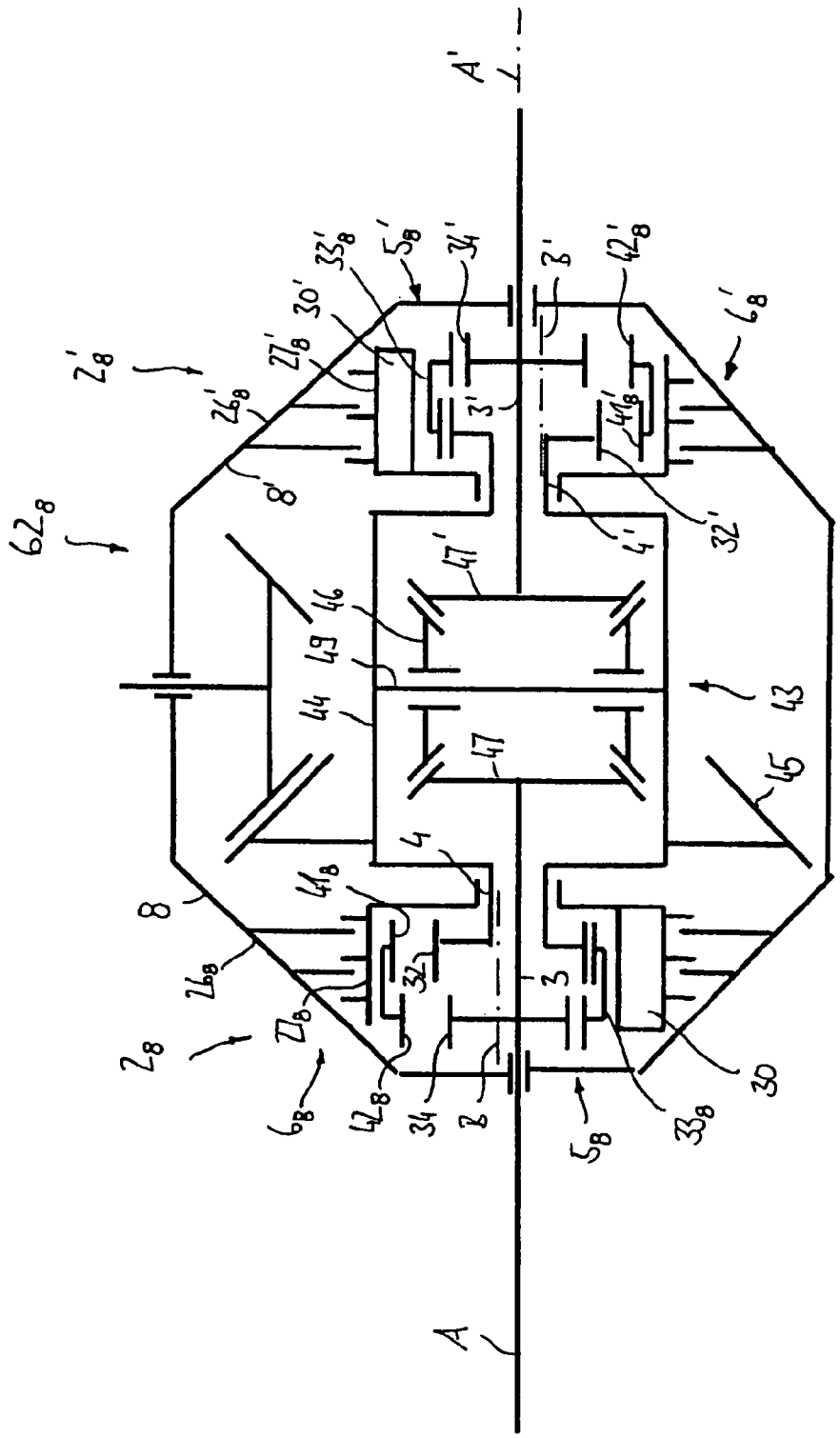
FIG. 8 is a diagrammatic illustration of an inventive transmission assembly with an inventive transmission module in an eighth embodiment showing the design principle.

FIG. 8 shows a transmission assembly in a further embodiment which, in respect of design, largely corresponds to that shown in FIG. 7. To that extent, reference is made to the above description. Those components which correspond to one another have been given the same reference numbers and the reference numbers of any modified components have been provided with the subscript "8". The present embodiment differs only in respect of the design of the hollow gears $33_8$, $33_8'$ which each comprise different toothed portions. The toothed portion $41_8$, $41_7'$ which engages the first sun gear 32, 32', and the toothed portion $42_8$, $42_8'$ which engages the second sun gear 34, 34' are located on different diameters and comprise different numbers of teeth. The first toothed portion $41_8$, $41_8'$ of the hollow gear $33_8$, $33_8'$ which engages the first sun gear 32, 32' comprises a larger number of teeth than the second toothed portion $42_8$, $42_8'$ of the hollow gear $33_8$, $33_8'$ which engages the second sun gear 34, 34'. The mode of functioning is the same as in the embodiment according to FIG. 7.

While preferred embodiments of the present invention have been shown and described herein, numerous variations and alternative embodiments will occur to those skilled in the art. Accordingly, it is intended that the invention is not limited to the preferred embodiments described herein but instead limited to the terms of the appended claims.

The invention claimed is:

1. A transmission module for a variable distribution of torque in the driveline of a motor vehicle, comprising:
a driveshaft (3) which, relative to a housing (8), is rotatingly drivable around a first axis of rotation (A), a hollow shaft (4) which is arranged coaxially relative to the driveshaft (3) and which is rotatingly drivable relative thereto, a transmission stage (5) having a first sun gear (32) which can be drivingly connected to the hollow shaft (4), a second sun gear (34) which is arranged so as to coaxially adjoin the first sun gear (32) and which is connected to the driveshaft (3) in a rotationally fixed way, and a hollow gear (33) which, in the housing (8), is rotatably supported on a second axis of rotation (B) extending parallel to the first axis of rotation (A), wherein said hollow gear (33) comprises a first internal toothing which meshingly engages the first sun gear (32) and wherein said hollow gear (33) comprises a second internal toothing which meshingly engages the second sun gear (34), wherein the first and the second sun gear (32, 34) comprise different numbers of teeth; a friction coupling (6) having a first coupling part (26) which is connected to the first sun gear (32) in a rotationally fixed way and having a second coupling part (27) which is rotatable relative to the first coupling part (26) and which is connected to the hollow shaft (4) in a rotationally fixed way, wherein, by actuating the friction coupling (6), the first sun gear (32) is drivingly connected to the hollow shaft (4).

2. A transmission module for a variable distribution of torque in the driveline of a motor vehicle, comprising:
a driveshaft (3) which, relative to a housing (8), is rotatingly drivable around a first axis of rotation (A), a hollow shaft (4) which is arranged coaxially relative to the driveshaft (3) and which is rotatingly drivable relative thereto, a transmission stage (5) having a first sun gear (32) which can be drivingly connected to the hollow shaft (4), a second sun gear (34) which is arranged so as to coaxially adjoin the first sun gear (32) and which is connected to the driveshaft (3) in a rotationally fixed way, and a hollow gear (33) which, in the housing (8), is rotatably supported on a second axis of rotation (B) extending parallel to the first axis of rotation (A), wherein said hollow gear (33) comprises a first internal toothing which meshingly engages the first sun gear (32) and wherein said hollow gear (33) comprises a second internal toothing which meshingly engages the second sun gear (34), wherein the first and the second sun gear (32, 34) comprise different numbers of teeth; and
a friction coupling (6) having a first coupling part (26) which is connected to the first sun gear (32) in a rotationally fixed way and having a second coupling part (27) which is rotatable relative to the first coupling part (26) and which is connected to the driveshaft (3) in a rotationally fixed way, wherein, by actuating the friction coupling (6), the driveshaft (3) is drivingly connected to the second sun gear (34).

3. A transmission module for a variable distribution of torque in the driveline of a motor vehicle, comprising, a driveshaft (3) which, relative to a housing (8), is rotatingly drivable around a first axis of rotation (A), a hollow shaft (4) which is arranged coaxially relative to the driveshaft (3) and which is rotatingly drivable relative thereto, a transmission stage (5) having a first sun gear (32) which can be drivingly connected to the hollow shaft (4), a second sun gear (34) which is arranged so as to coaxially adjoin the first sun gear (32) and which is connected to the driveshaft (3) in a rotationally fixed way, and a hollow gear (33) which, in a carrying element (30), is rotatably supported on a second axis of rotation (B) which extends parallel to the first axis of rotation (A), wherein said hollow gear (33) comprises a first internal toothing which meshingly engages the first sun gear (32) and wherein said hollow gear (33) comprises a second internal toothing which meshingly engages the second sun gear (34), wherein the first and the second sun gear (32, 34) comprise different numbers of teeth, and wherein the carrying element (30) is rotatably supported in the housing (8) coaxially relative to the first axis of rotation (A); and a friction coupling (6) having a first coupling part (26) which is connected to the housing (8) in a rotationally fixed way, and a second coupling part (27) which is rotatable relative to the first coupling part (26) and which is connected to the carrying element (30) in a rotationally fixed way, wherein, by actuating the friction coupling (6), the carrier element (30) is decelerated relative to the housing (8).

4. A transmission module according to claim 1 wherein the first internal toothing of the hollow gear (33) differs from the second internal toothing of the hollow gear (33).

5. A transmission module according to claim 1 wherein the first and second internal toothings of the hollow gear (33) are identical, wherein the first sun gear (32) and the second sun gear (34) are arranged at the same distance (E) from the second axis of rotation of the hollow gear (33) and comprise sun gear toothings which are profile-displaced.

6. A transmission module according to claim 5, wherein the first and second toothings of the hollow gear (33) adjoin one another seamlessly.

7. A transmission module according to claim 1 wherein the numbers of teeth of the first and of the second sun gear (32, 34) have been selected to be such that there is generated a transmission ratio of 0.85 to 1.5 between the first and the second sun gear (32, 34).

8. A transmission module according to claim 7, wherein the number of teeth (Z3) of the hollow gear (33) is greater than the number of teeth (Z1) of the first sun gear (32), and that the number of teeth (Z1) of the first sun gear (32) is greater than the number of teeth (Z2) of the second sun gear (34).

9. A transmission module according to claim 1 wherein the first sun gear (32), the second sun gear (34) and the hollow gear (33) comprise helical teeth.

10. A transmission module according to claim 1, wherein by means of a rolling contact bearing (38), the hollow gear (33) is rotatably supported on a bearing projection (39) of the housing (8) so as to be positioned eccentrically relative to the first axis of rotation (A).

11. A transmission module according to claim 1 wherein by bearing means (35, 58, 59), the first sun gear (32) is rotatably supported on the second sun gear (34).

12. A transmission module according to claim 1 wherein there is provided an axial setting device (17) for actuating the friction coupling (6).

13. A differential assembly (62) for a variable distribution of torque in the driveline of a motor vehicle, comprising:
a differential drive (43) having a rotatingly drivable differential carrier (44), differential gears (46) rotatably held in the differential carrier (44) and jointly rotating therewith around a first axis of rotation (A), as well as having two sideshaft gears (47) which are rotatably supported on the first axis of rotation (A) and which engage the differential gears (46); and
at least one transmission module (2) according to claim 1 wherein the hollow shaft (4) is connected to the differential carrier (44) in a rotationally fixed way and wherein the driveshaft (3) is connected to one of the two sideshaft gears (47) in a rotationally fixed way.

14. A transmission module according to claim 2 wherein the first internal toothing of the hollow gear (33) differs from the second internal toothing of the hollow gear.

15. A transmission module according to claim 2 wherein the first and second internal toothings of the hollow gear (33) are identical, wherein the first sun gear (32) and the second sun gear (34) are arranged at the same distance (E) from the second axis of rotation of the hollow gear (33) and comprise sun gear toothings that are profile-displaced.

16. A transmission module according to claim 2 wherein the numbers of teeth of the first and of the second sun gear (32, 34) have been selected to be such that there is generated a transmission ratio of 0.85 to 1.5 between the first and the second sun gear (32, 34).

17. A transmission module according to claim 2 wherein by means of a rolling contact bearing (38), the hollow gear (33) is rotatably supported on a bearing projection (39) of the housing (8) so as to be positioned eccentrically relative to the first axis of rotation (A).

18. A transmission module according to claim 3 wherein the first internal toothing of the hollow gear (33) differs from the second internal toothing of the hollow gear (33).

19. A transmission module according to claim 3 wherein the first and second toothings of the hollow gear (33) are identical, wherein the first sun gear (32) and the second sun gear (34) are arranged at the same distance (E) from the second axis of rotation of the hollow gear (33) and comprise sun gear toothings that are profile-displaced.

20. A transmission module according to claim 3 wherein the numbers of teeth of the first and of the second sun gear (32, 34) have been selected to be such that there is generated a transmission ratio of 0.85 to 1.5 between the first and the second sun gear (32, 34).

* * * * *